United States Patent [19]
Dutcher et al.

[11] Patent Number: 5,152,608
[45] Date of Patent: Oct. 6, 1992

[54] THERMOCOUPLE PURGE SYSTEM

[75] Inventors: Dale E. Dutcher, Pasadena; Howard L. Hilborn, El Lago; Ben J. Grieb, Houston, all of Tex.

[73] Assignee: Gay Engineering & Sales Company, Inc., Pasadena, Tex.

[21] Appl. No.: 793,139

[22] Filed: Nov. 18, 1991

[51] Int. Cl.⁵ .............................. G01K 1/08
[52] U.S. Cl. .................... 374/125; 136/230; 374/179
[58] Field of Search ............... 374/125, 179; 136/230

[56] References Cited

U.S. PATENT DOCUMENTS

| | | | |
|---|---|---|---|
| 1,615,451 | 1/1927 | Harrison | 374/179 X |
| 3,263,502 | 8/1966 | Springfield | 136/230 X |
| 3,400,587 | 9/1968 | Franck | 374/179 X |
| 3,935,032 | 1/1976 | Brandeberry et al. | 374/179 X |
| 4,376,227 | 3/1983 | Hillborn | 136/230 X |
| 4,435,093 | 3/1984 | Kranse et al. | 374/125 X |
| 5,005,986 | 4/1991 | Najjar et al. | 374/125 X |

Primary Examiner—Daniel M. Yasich
Attorney, Agent, or Firm—Robert W. B. Dickerson

[57] ABSTRACT

In a temperature measuring system for determining the temperature at numerous levels within a reactor: A flexible thermocouple support is introduced into a well which is positioned inside the reactor; the measuring system includes a hollow flexible thermocouple support extending from outside the well through one well end to near the opposite well end, and the hollow support is adapted to receive a purging substance and to pass said purging substance into the well.

6 Claims, 4 Drawing Sheets

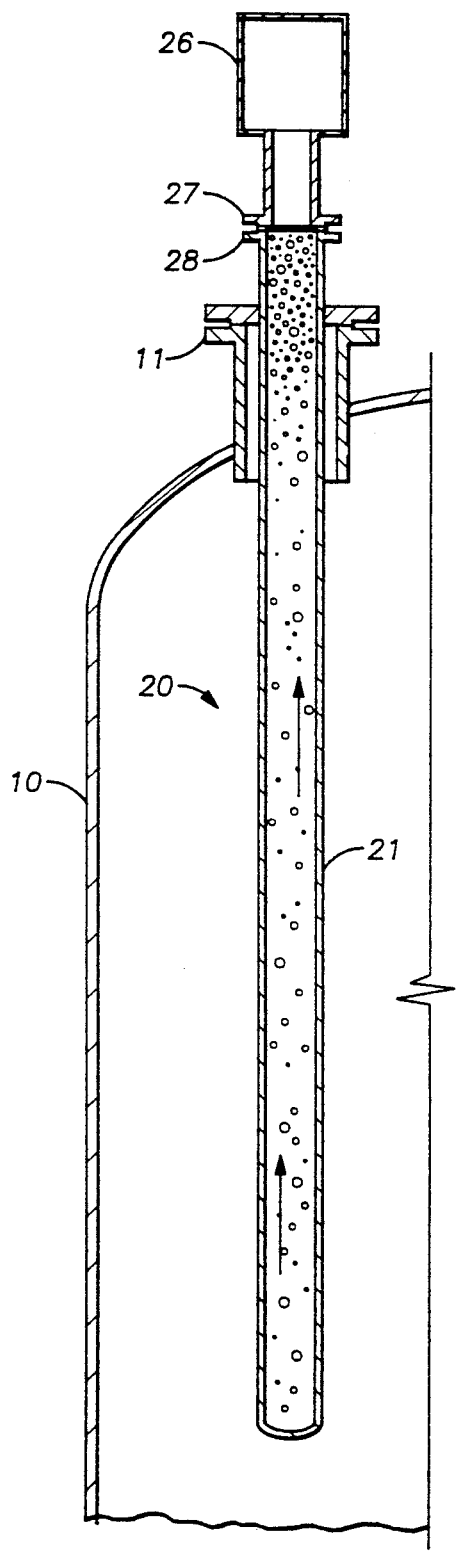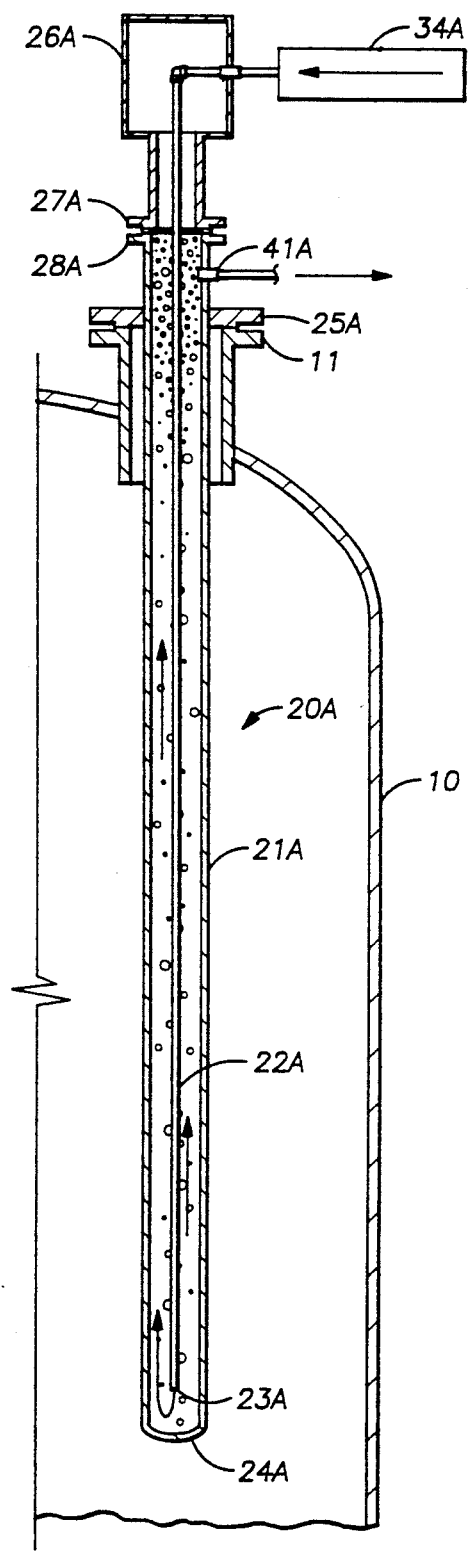
FIG. 1A
(PRIOR ART)
FIG. 1B

THERMOCOUPLE PURGE SYSTEM

BACKGROUND OF THE INVENTION

Thermocouple containing devices have long been used to measure temperatures within reactors or chambers, such as may be used in the chemical and refining industries. Examples of such uses are described in U.S. Pat. Nos. 3,015,234; 3,263,502; 3,637,438; 3,864,975; 3,901,080; 4,376,227; and 4,625,200. Many examples of the prior art permit such measurement at a number of discrete levels of the reactor. At least two of the mentioned patents (see U.S. Pat. Nos. '502 and '227) describe, as a means for performing such plural measurements, the insertion of a flexible support, having a plurality of thermocouple cables wrapped therearound, into a well which well is positioned within the reactor. Although such arrangements represented vast improvements over the then prior art, at least one unfortunate problem was not fully solved Accumulations of harmful materials, such as corrosive vapors or liquids, formed within the well. These materials can cause deterioration of the well, materials in which the thermocouple elements may be encased, and can cause failure of the temperature measuring members, i.e., thermocouples themselves. This invention was intended to minimize the problems associated with the concentration of contaminants within the protective well, without sacrificing the flexibility, accuracy, and response characteristics of the temperature measuring system.

SUMMARY OF THE INVENTION

A well, which is open at one end and closed at the other, has its closed end inserted within a reactor vessel, and the well is secured to the reactor. A flexible, hollow, combination purge tube and support rod is then inserted within such well. Prior to such insertion, a plurality of thermocouple-containing cables are wrapped around and secured to said rod. The lower end of the rod would normally be positioned near the well's closed end, while the rod's upper end would extend outwardly of the reactor and well Said rod upper end serves as a purge fluid inlet Such fluid would pass through the rod to exit near the well bottom, circulate through the well to exit through an outlet exterior of the well

DESCRIPTION OF THE DRAWINGS

FIG. 1A is a somewhat schematic elevation depicting a reactor well without a purge system; while FIG. 1B is a similar view illustrating a generalized purge system;

DESCRIPTION OF THE INVENTION

This invention is particularly intended and developed to be used with a flexible thermocouple support such as those described by the previously mentioned U.S. Pat. Nos. '502 and '227.

FIGS. 1A and 1B depict, respectively, a non-purged, 20, and a purged, 20A, temperature measuring system. The former appears on the left side and the latter on the right side of a common, but broken, idealized reactor or reactor vessel or chamber 10. Each includes a well, 21 and 21A, respectively, inserted within and secured to vessel 10. In each instance, a plurality of temperature measuring, thermocouple junction containing sheaths or cables (hereinafter sometimes referred to as thermocouple cables) would extend within the wells, in a known manner. The free end of such thermocouple cables would extend out of the well to a remote junction box, which may be contained within enclosures 26 or 26A, respectively, where the leads from each thermocouple cable would be electrically linked to known measuring instrumentation. Such technology does not, as such, form a part of this invention.

Figure 2A:
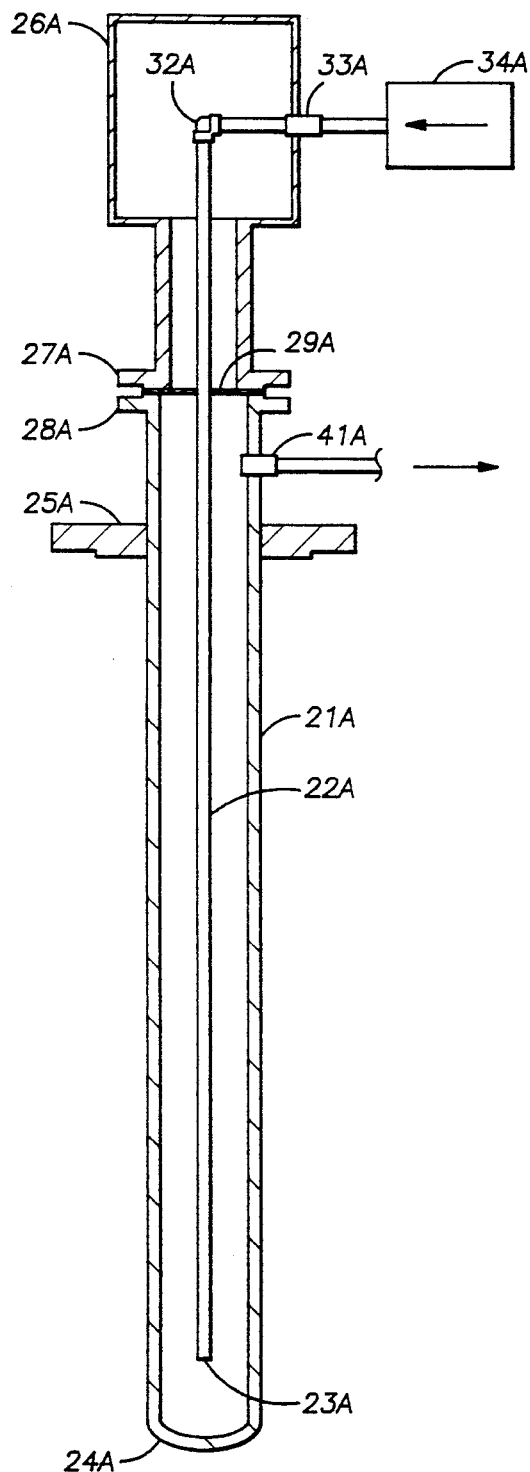
FIGS. 2A, 2B and 2C, somewhat schematically, illustrate embodiments having diverse fluid inlet-outlet arrangements.

The same basic structure is shown in FIG. 2A as in 1B, except on an enlarged basis, like numbers being used to describe like parts. A combination support rod and purge tube 22A shortened hereafter to purge tube, is shown to extend almost throughout the length of well 21A. The open lower end 23A is shown positioned closely adjacent closed end 24A of well 21A. Said well is normally removably fixed to reactor flange 11 by well or process flange 25A. Securing bolts are not shown.

Figure 2B:
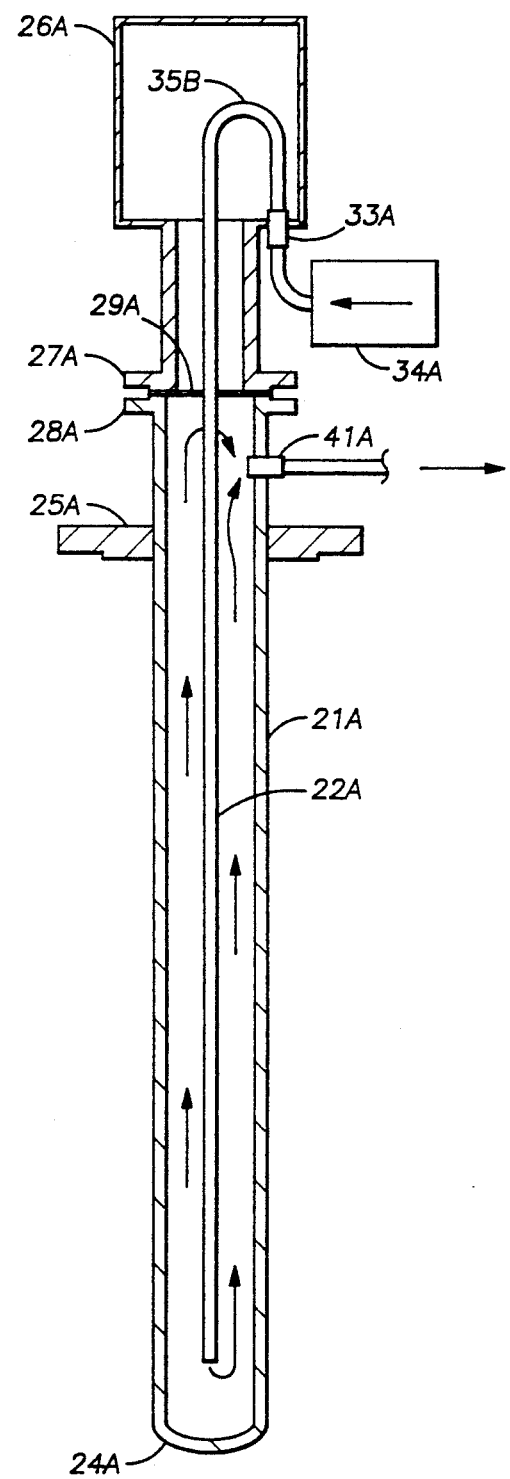
Figure 2C:
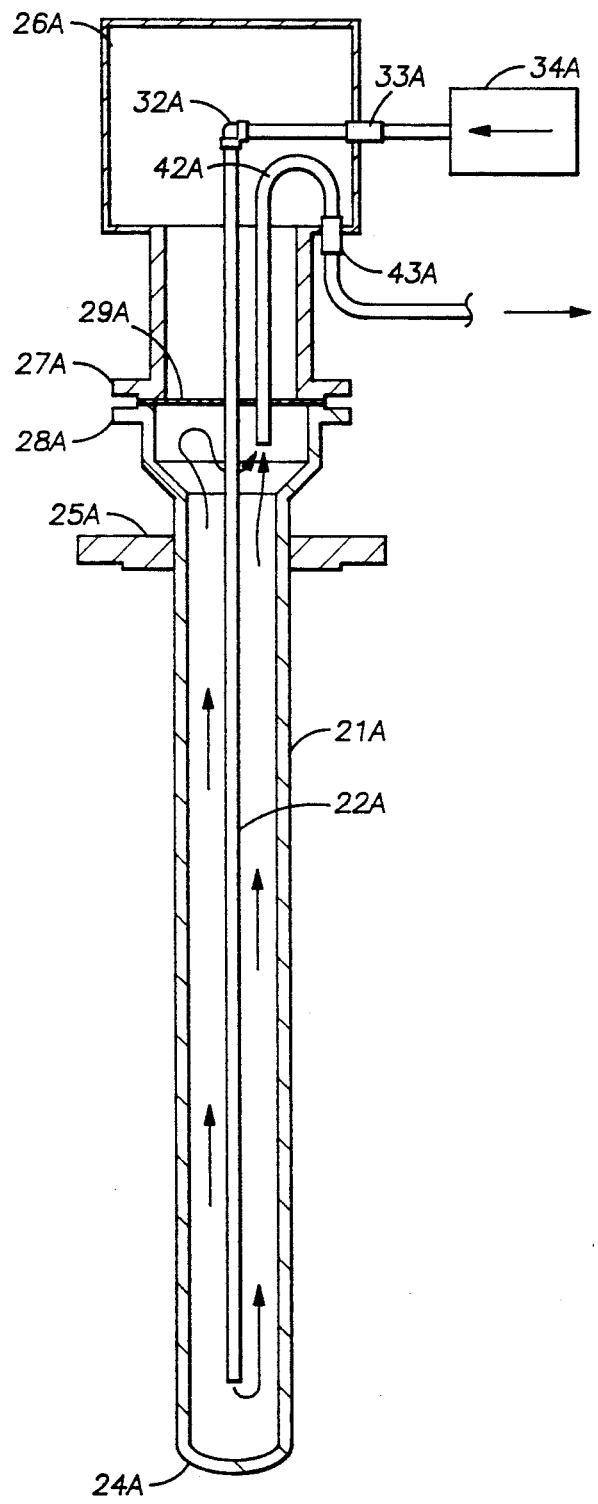
Figure 3:
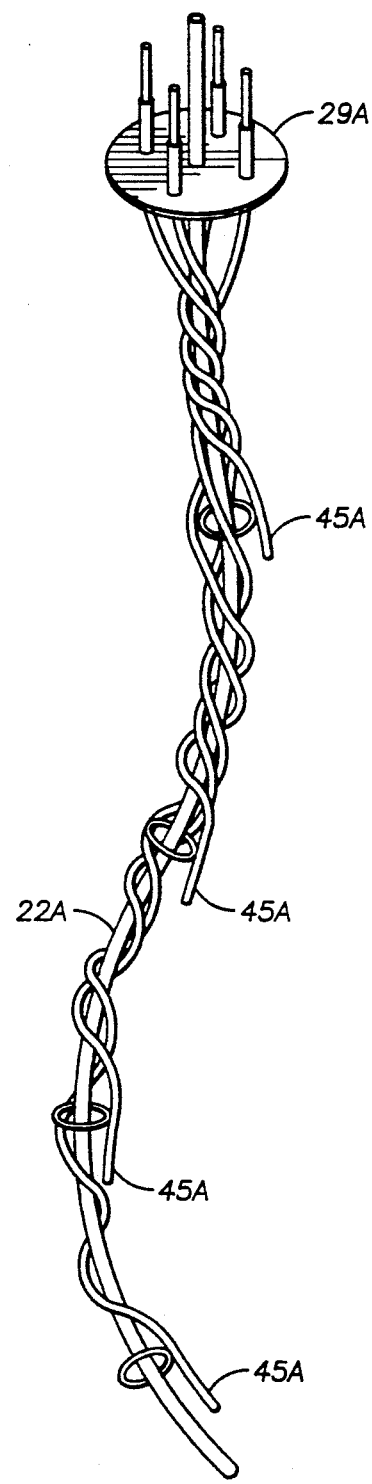
FIG. 3 is a partial perspective of the flexible purge tube.

Enclosure 26A is also removably fixed to well 21A by having enclosure flange 27A releasably secured (by bolts not shown) to well flange 28A. Intermediate said flanges, as shown in FIGS. 2A, 2B and 2C, seal plate 29A is sealingly secured Hollow purge tube 22A is shown to extend substantially throughout well 21A, upwardly through the wells open end, through a central aperture 31A in seal plate 29A, into enclosure 26A. As shown in FIGS. 1B, 2A, and 2C, merely as illustrations the purge tube engages elbow fitting 32A to communicate with purge inlet fitting 33A. A purge fluid source generally shown at 34A would provide purge fluid to the fluid inlet, said fluid exiting purge tube 22A at its open end 23A.

FIG. 2B provides an alternate purge tube embodiment, by bending its end adjacent purge tube inlet 33A through 180°, as at 35B.

FIGS. 2A, 2B and 2C provide alternate purge fluid outlet arrangements. In FIGS. 2A, 2B, nipple 41A which extends laterally of well 21A, communicates with the purge fluid circulating generally upwardly through the interior of well 21A. Said nipple may vent to atmosphere or may communicate with a conduit for directing the emitted fluid to a holding tank for recycling or for disposal. In this configuration, the outlet is preferably positioned intermediate well flanges 25A and 28A.

FIG. 2C illustrates a modified purge fluid outlet arrangement In place of the nipple outlet 41A of the earlier described arrangement, a separate hollow conduit 42A communicates between purge fluid outlet 43A and the interior of well 21A, by passing through seal plate 29A Said conduit 42A may undergo a 180° bend, as shown in FIG. 2C, or one of 90°, as illustrated in purge tubes 22A of FIGS. 1B and 2A. Conduit 42A, like purge tube 22A, would be sealingly received by a further aperture (not shown but like aperture 31A) through seal plate 29A.

Figure 4:
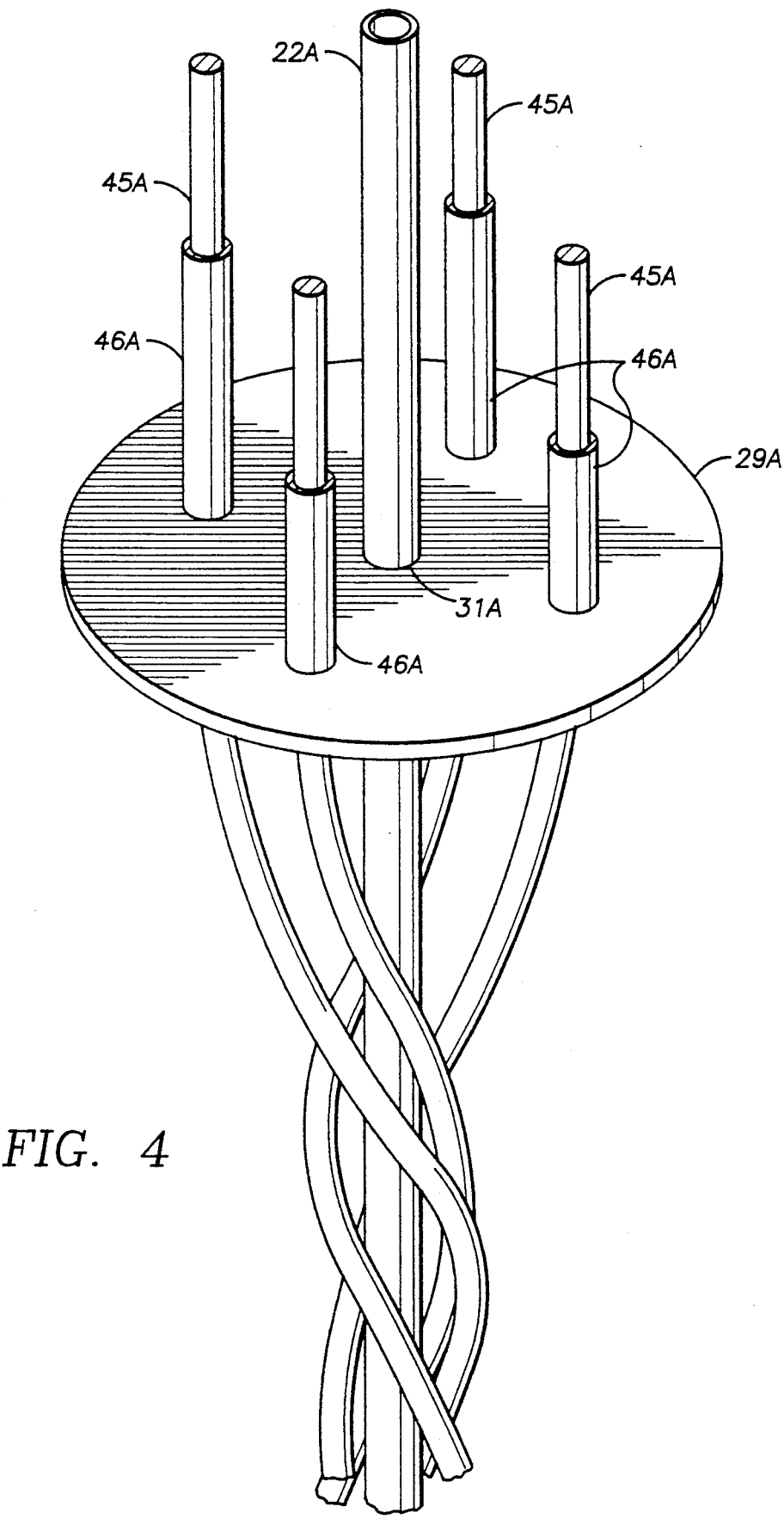
FIG. 4 is a broken perspective of the seal plate.

The seal plate 29A of FIG. 4, sealingly receives and positions a number of stubs 46A which sealingly receive, as by brazing, thermocouple-containing cables 45A, similar to such receipt by sealing plate or disc 40 of said U.S. Pat. No. '227. Additionally, plate 29A similarly receives and sealingly secures purge tube 22A. Individual cables 45A are spirally wrapped around tube 22A, and have their junctions pressed against the interior of well 21A by bi-metallic or spring members in a manner known in that art.

As previously mentioned, purge tube 22A is hollow and flexible. Thus, the tube of this invention may be used in the manner illustrated by U.S. Pat. No. '502, additionally having the ability to purge contaminants from the interior of its well.

Although limited embodiments have been described, it should be obvious that numerous modifications would be possible by one skilled in the art without departing from the spirit of the invention, the scope of which is limited only by the following claims.

We claim:

1. A thermocouple assembly adapted to be inserted in a chamber well, said well being sealed form said chamber and comprising:
   a combination support and purge tube member;
   a plurality of thermocouple cables wound around said combination member;
   means for pressure sealing said well, said well sealing means receiving said plurality of thermocouple cables and said combination member; purge fluid exhaust conduit; and said combination member being flexible and including inlet means for receiving said purge fluid, outlet means for exiting said purge fluid, and purge fluid passageway means connecting said inlet and outlet means.

2. The assembly of claim 1 wherein said exhaust conduit passes through said well sealing means.

3. A system for measuring temperatures at a plurality of levels in a chamber, said system comprising:
   a chamber-insertable well member, open at one end;
   a combination thermocouple cable support and purge tube member removably insertable within said well;
   a plurality of thermocouple cables wound around said combination member;
   means for pressure sealing said well, said well sealing means receiving, and passing therethrough, said plurality of thermocouple cables and said combination member; purge fluid exhaust conduit; and said combination member being flexible and including inlet and outlet means for receiving and exiting, respectively, said purge fluid, and purge fluid passageway means connecting said inlet and outlet means.

4. The system of claim 3 wherein said exhaust conduit includes an exhaust passageway through a wall of said well.

5. The system of claim 3 wherein said exhaust conduit has one end extending interiorly of said well and has its other end extending outwardly thereof.

6. The system of claim 3 wherein said exhaust conduit is received by and passes through said well sealing means.

* * * * *